Jan. 7, 1930.     E. K. BAKER     1,742,373
SPLIT RIM OPERATING TOOL
Filed Nov. 2, 1925
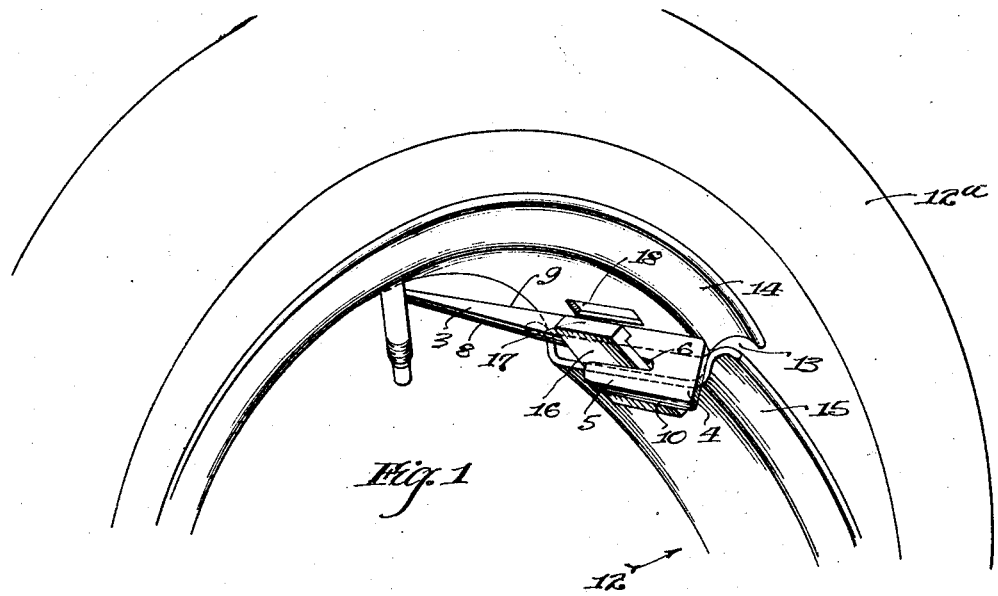
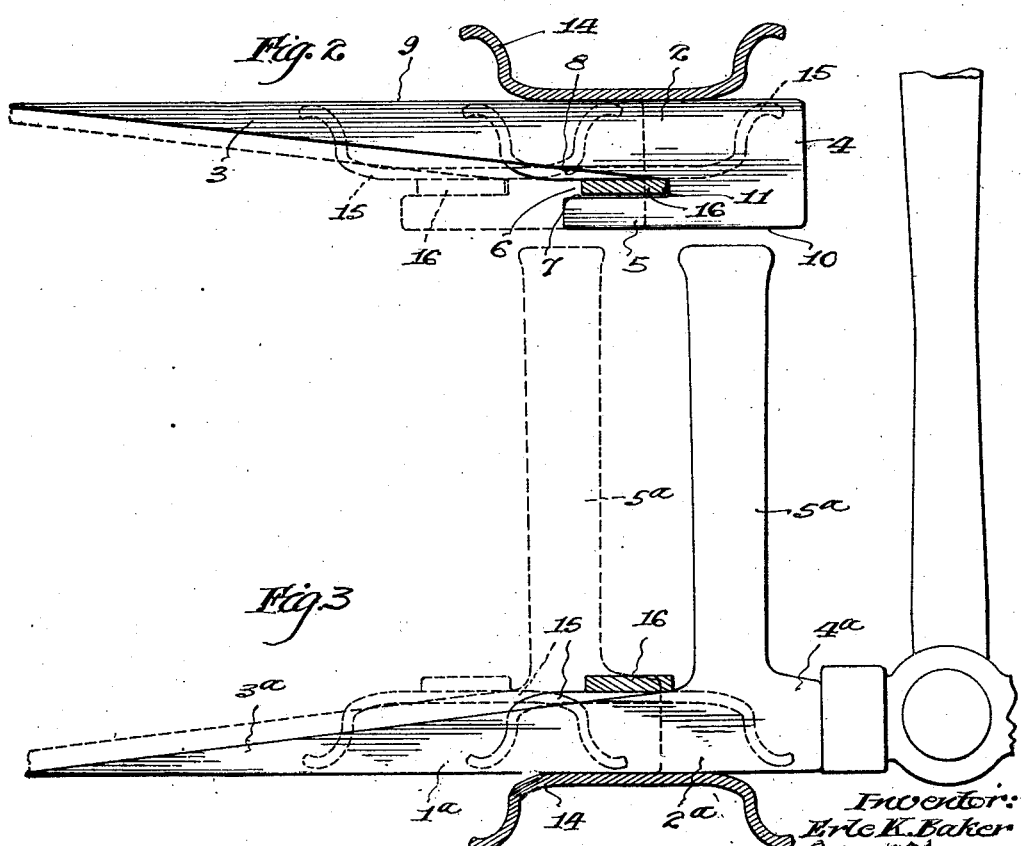
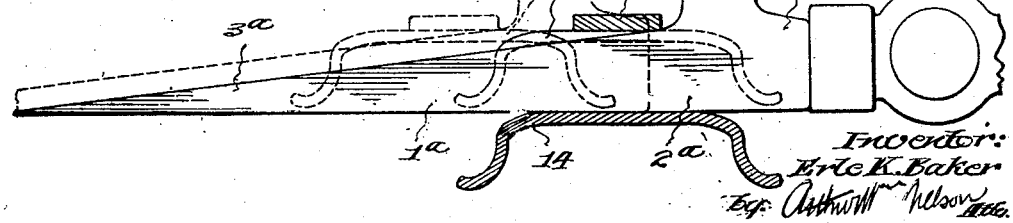

Patented Jan. 7, 1930

1,742,373

UNITED STATES PATENT OFFICE

ERLE K. BAKER, OF CHICAGO, ILLINOIS

SPLIT-RIM OPERATING TOOL

Application filed November 2, 1925. Serial No. 66,410.

This invention relates to improvements in split rim operating tools and consists of the matters hereinafter described and more particularly pointed out in the appended claim.

The primary object of the invention is to provide a simple and efficient tool for not only disconnecting the usually locked together ends of the rim, but also for contracting the rim at the split and to separate one end laterally with respect to not only the other rim end but also the tire so that it may be easily removed from the tire.

A further object of the invention is to provide a tool which may be readily made from a single stamping of comparatively thin metal, which tool includes a wedge adapted to be entered and driven in between the usual connector plate and one end of the rim with which said plate is detachably engaged, to contact the other rim end, and to include a part which prevents tipping over of the tool in use and at the same time in the further driving of the tool, to shift said contracted end of the rim laterally so that an easy relative separation between the rim and tire is possible.

These objects of the invention, as well as others, together with the many advantages thereof, will more fully appear as I proceed with my specification.

In the drawings:

Fig. 1 is a perspective view of a portion of a tire and its associated split rim showing one form of my improved rim tool in position thereon after having been driven partly into place to separate the rim ends radially.

Fig. 2 is a view in side elevation of my improved rim tool, showing the same in the different positions it occupies with respect to the associated rim ends as when using the same to remove a split rim from a tire.

Fig. 3 is a view in side elevation of a modified form of my improved rim tool as it appears in different positions of use in connection with a tire rim.

Referring now in detail to that embodiment of the invention, illustrated in Figs. 1 and 2 of the accompanying drawings, 1 indicates as a whole one form of my improved rim tool. As shown therein, said tool is preferably made from a stamping of relatively thin strip metal but as is apparent, it may also be made in the form of a forging without departing from the spirit of the invention. Said tool comprises an elongated flat body 2, formed to provide a pointed wedge portion 3 arranged in the plane of the edges of the body along one side thereof, and extending from one end of said body to substantially the other end thereof which forms the driving head 4 of a width greater than the adjacent or inner end of the wedge portion. On the other side of the body is formed a tongue 5 which overhangs the inner edge of the wedge portion and provides in connection therewith a recess 6, that edge 7 of the tongue adjacent the inclined edge 8 of the wedge being parallel with the side edges 9 and 10 of the body so that said recess decreases or tapers in width as it approaches its closed end 11 in the body adjacent the driving end, thus providing a shoulder at said closed end.

My improved tool as above described is primarily intended for use in connection with a split rim 12 adapted to receive a pneumatic tire casing 12ª of the straight side type. Said rim is transversely split as at 13 to provide the abutting rim ends 14 and 15, respectively. On the underside of the base of the rim end 15 is rigidly secured one end of a locking or connector plate 16, the other end of which underhangs the rim end 14 and carries a transversely extending lug 17 adapted to enter a correspondingly shaped opening 18 in the base of the rim end 14. Assume that a tire is mounted on the rim, the ends 14 and 15 which are locked together by the member 16, the lug 17 of which is engaged in the opening 18 in the rim end 14. To cause a relative removal between the rim and tire, the pointed edge of my improved rim tool is inserted between the locking or connector plate 16 and base of the rim end 14, with the inclined edge 8 of the wedge in engagement with said plate and with the straight edge 9 in engagement with the base of the rim end 14. The wedge is now driven transversely of the tire and rim by striking the driving head 4 with a hammer or other suitable device. As the tool is driven home the edge 9 will ride against the base of the rim end 14 and press the same firmly against the tire and the edge 8 will ride against the connector plate and move the same radially inwardly of the rim. When the connector plate enters the slot 6 in the driving of the tool the edge 7 of the tongue 5 is so engaged against the underside of the connector plate as to prevent lateral tipping of the tool in the plane of the rim under the natural expansive tendency of the rim. The tool is so formed that when the approaching edge of the connector plate reaches the shoulder-like inner end 11 of the recess 6, the rim end 15 has been moved radially inward, far enough to clear the rim end 14. Thus, as is apparent the greatest dimension of the wedge near the shoulder 11 is somewhat greater than the radial depth of the rim to bring about the clearing of the rim ends when the edge of the connector plate is in engagement with the shoulder 11. Further driving on the head 4 when the connector plate is in engagement with the shoulder 11 will cause the rim end 15 to be moved laterally of the rim end 14, as shown in dotted lines in Fig. 2. With the shoulder and connector plate engaged as before described, the danger of splitting the tool at the head is eliminated. The rim when in this condition is easily removed from the tire and a few taps on the end of the tongue 5 will loosen and disengage the tool from the connector plate.

In Fig. 3 I have shown a modified form of the invention wherein the tool embodies a body 1ª having a wedge portion 3ª and driving head 4ª and includes a lateral handle extension 5ª extending at a right angle to the body 2ª, in the plane of the edges thereof. Said handle provides a convenient means for holding the tool with one hand and against tipping when driving the tool home with a hammer as shown for the intended purpose of the tool. The junction of the handle and body on the wedge side of the tool acts in the manner of a shoulder against which the edge of the connector plate engages as when driving the one rim end laterally of the other as described in connection with Figs. 1 and 2 and as shown in dotted lines in Fig. 3, the inner ends and connector plate bearing the same reference numerals as before.

My improved tool which is indeed of simple construction, may be produced at an extremely low cost and this without in anyway detracting from the practical and efficient operation thereof for its intended purpose. While in describing my invention, I have referred to many details of construction as well as form and arrangement of the parts thereof, this is to be taken as by way of illustration only and not by way of limitation except as may be pointed out in the appended claim.

I claim as my invention:

A tool for driving one end of a split rim laterally out of line with the other end, comprising a narrow wedge body having one flat side and the opposite side at a uniform incline to the first, and adapted to be forcibly inserted between the lock plate on one end of the rim and the overlying part of the other end of the rim, and having a thickness sufficient to force the lock-plate end of the rim sufficiently below the other end to pass laterally thereof, said wedge body having on the inclined side a shoulder beyond the point where it has reached this thickness, and the flat face continuing beyond the shoulder to the extent of the width of the inner face of the rim; the wedge body terminating beyond the shoulder in a transverse striking face.

In testimony whereof, I have hereunto set my hand, this 13th day of October, 1925.

ERLE K. BAKER.